US012613610B2

(12) United States Patent
Beri et al.

(10) Patent No.: US 12,613,610 B2
(45) Date of Patent: Apr. 28, 2026

(54) GRAPHICAL USER INTERFACE FOR CENTRALIZED REGISTER DEVICE MANAGEMENT AND MONITORING

(71) Applicant: Capital One Services, LLC, McLean, VA (US)

(72) Inventors: Alec Beri, Arlington, VA (US); Ashay Sheth, New York, NY (US); Joshua Torkelson, Spotsylvania, VA (US); Kyle Rafferty, Washington, DC (US); Michael Katz, Arlington, VA (US); Michael Ken Louie, Spotsylvania, VA (US); Nagini Kodukula, Herndon, VA (US); Stefan Zimmerman, Wilmington, DE (US); Stephen Young, Keswick, VA (US); Suranya Jayan, Arlington, VA (US); Tyler Pilato, Reston, VA (US); Zachary Polsky, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 1148 days.

(21) Appl. No.: 17/455,319

(22) Filed: Nov. 17, 2021

(65) Prior Publication Data

US 2023/0152938 A1 May 18, 2023

(51) Int. Cl.
*G06F 3/0482* (2013.01)
*G06F 8/65* (2018.01)
(Continued)

(52) U.S. Cl.
CPC .............. *G06F 3/0482* (2013.01); *G06F 8/65* (2013.01); *G06F 11/3051* (2013.01);
(Continued)

(58) Field of Classification Search
CPC ...... G06F 3/0482; G06F 8/65; G06F 11/3051; G06F 11/3055; G06F 11/3072;
(Continued)

(56) References Cited

U.S. PATENT DOCUMENTS 5,910,803 A * 6/1999 Grau ....................... H04L 41/22
                                                          709/224
5,984,178 A * 11/1999 Gill .......................... G07F 19/21
                                                          235/379
(Continued)

*Primary Examiner* — Andrew L Tank
(74) *Attorney, Agent, or Firm* — Harrity & Harrity, LLP

(57) ABSTRACT

In some implementations, a device may receive, via a data stream, log data associated with a set of register devices and may extract state information associated with the set of register devices from the log data. The device may transmit, to a client device, presentation information to cause the state information associated with the set of register devices and one or more user selection options for initiating actions to be performed by the set of register devices to be displayed by the client device via a graphical user interface (GUI). The device may receive an indication of a user input provided via the GUI associated with a user selection option of the one or more user selection options, that indicates an action to be performed by a register device. The device may communicate, with the register device, to cause the register device to perform the action.

20 Claims, 11 Drawing Sheets

(51) Int. Cl.

| | |
|---|---|
| *G06F 11/30* | (2006.01) |
| *G06F 11/32* | (2006.01) |
| *G06F 21/57* | (2013.01) |
| *H04L 9/40* | (2022.01) |
| *H04L 67/303* | (2022.01) |

(52) U.S. Cl.

CPC ...... *G06F 11/3055* (2013.01); *G06F 11/3072* (2013.01); *G06F 11/328* (2013.01); *G06F 21/577* (2013.01); *H04L 63/302* (2013.01); *H04L 67/303* (2013.01)

(58) Field of Classification Search

CPC .... G06F 11/328; G06F 21/577; H04L 63/302; H04L 67/303; G06Q 20/1085; G07F 19/20; G07F 19/209; G07F 19/207; G07F 19/211

See application file for complete search history.

(56) References Cited

U.S. PATENT DOCUMENTS

| | | | | |
|---|---|---|---|---|
| 6,768,975 | B1 * | 7/2004 | Gill ......................... | G07F 9/001 |
| | | | | 235/382 |
| 7,104,441 | B2 * | 9/2006 | Shepley .................. | G07F 19/20 |
| | | | | 235/379 |
| 7,636,874 | B2 * | 12/2009 | Gutbrod ............... | G06Q 20/102 |
| | | | | 705/40 |
| 8,108,726 | B2 * | 1/2012 | McGraw, IV .......... | G07F 19/20 |
| | | | | 714/48 |
| 8,495,424 | B1 * | 7/2013 | Vannatter ............. | G07F 19/209 |
| | | | | 714/48 |
| 8,832,650 | B2 * | 9/2014 | MacPhail ................. | G06F 8/34 |
| | | | | 717/121 |
| 9,779,588 | B2 * | 10/2017 | Angus ............. | G06Q 10/06316 |
| 10,121,125 | B2 * | 11/2018 | Mande ................. | G06Q 30/016 |
| 10,185,620 | B2 * | 1/2019 | Ewington ............. | G07F 19/206 |
| 10,409,582 | B1 * | 9/2019 | Maehler .................... | G06F 8/65 |
| 11,200,548 | B2 * | 12/2021 | Rose ..................... | H04W 12/06 |
| 11,315,379 | B1 * | 4/2022 | Crandall .............. | G07G 1/0009 |
| 11,403,601 | B2 * | 8/2022 | Dryer ..................... | G07D 11/34 |
| 12,088,455 | B2 * | 9/2024 | McHugh ............. | H04L 41/0659 |
| 2002/0032655 | A1 * | 3/2002 | Antonin ............... | G07F 19/207 |
| | | | | 705/43 |
| 2002/0082994 | A1 * | 6/2002 | Herziger ............... | G06Q 10/06 |
| | | | | 705/43 |
| 2002/0123966 | A1 * | 9/2002 | Chu ...................... | G06Q 20/04 |
| | | | | 705/43 |
| 2014/0006232 | A1 * | 1/2014 | Viehweger ............. | G06Q 40/12 |
| | | | | 705/30 |
| 2017/0061407 | A1 * | 3/2017 | Kuhn .................... | G07F 19/206 |
| 2017/0364871 | A1 * | 12/2017 | Kurian ................. | H04L 63/105 |
| 2018/0137486 | A1 * | 5/2018 | Nikkel .............. | G06Q 20/1085 |
| 2019/0188993 | A1 * | 6/2019 | Hernoud ................. | G06F 21/84 |

* cited by examiner

116
Display GUI for managing and maintaining the fleet of register devices

Client Device

114
Presentation information

State Information Database

110
Running state information

112
Generate presentation information and/or DOM for a GUI to display the state information for the fleet of register devices Fleet Management Device

100

200

400

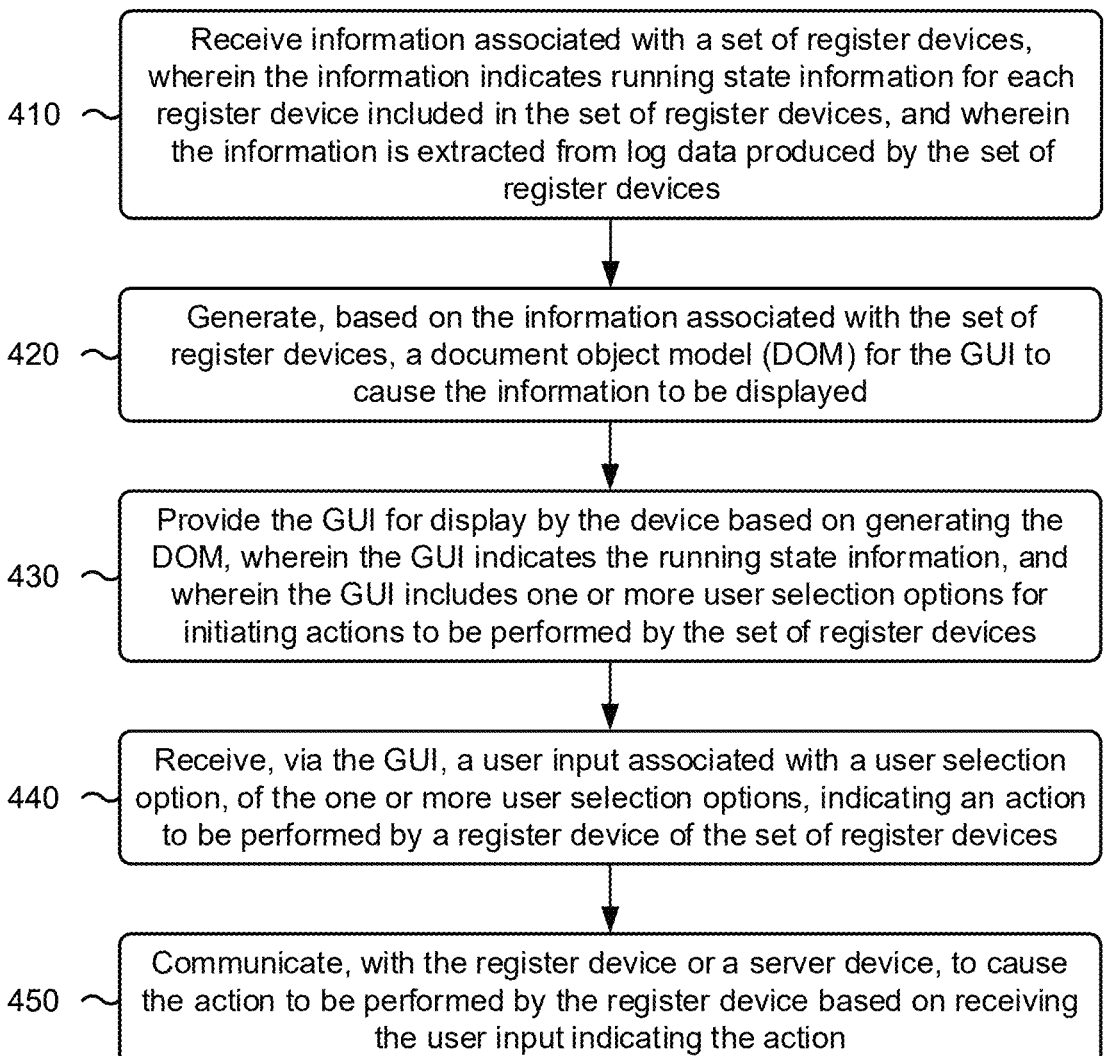

410 — Receive information associated with a set of register devices, wherein the information indicates running state information for each register device included in the set of register devices, and wherein the information is extracted from log data produced by the set of register devices 420 — Generate, based on the information associated with the set of register devices, a document object model (DOM) for the GUI to cause the information to be displayed 430 — Provide the GUI for display by the device based on generating the DOM, wherein the GUI indicates the running state information, and wherein the GUI includes one or more user selection options for initiating actions to be performed by the set of register devices 440 — Receive, via the GUI, a user input associated with a user selection option, of the one or more user selection options, indicating an action to be performed by a register device of the set of register devices 450 — Communicate, with the register device or a server device, to cause the action to be performed by the register device based on receiving the user input indicating the action

FIG. 4

500

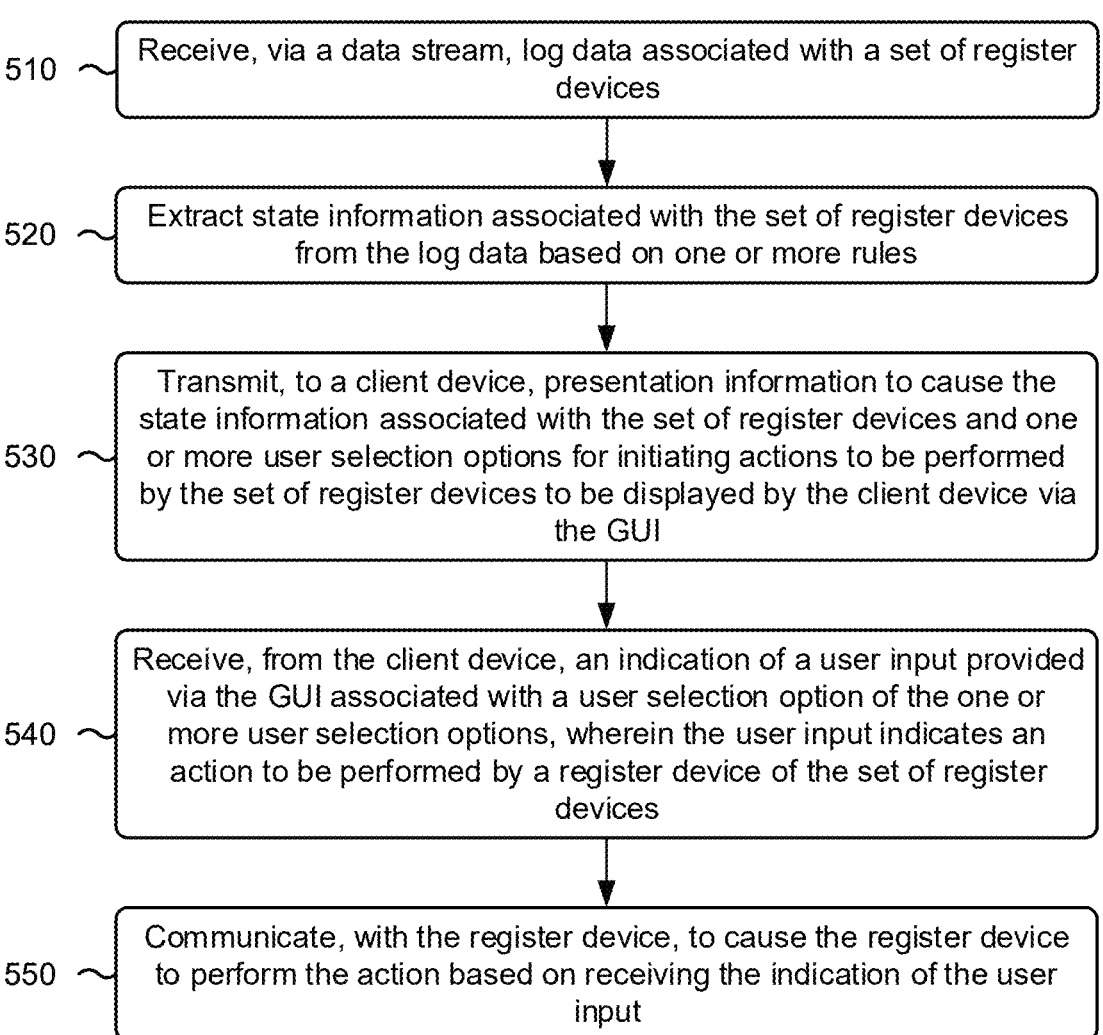

510 ⌇ Receive, via a data stream, log data associated with a set of register devices 520 ⌇ Extract state information associated with the set of register devices from the log data based on one or more rules 530 ⌇ Transmit, to a client device, presentation information to cause the state information associated with the set of register devices and one or more user selection options for initiating actions to be performed by the set of register devices to be displayed by the client device via the GUI 540 ⌇ Receive, from the client device, an indication of a user input provided via the GUI associated with a user selection option of the one or more user selection options, wherein the user input indicates an action to be performed by a register device of the set of register devices 550 ⌇ Communicate, with the register device, to cause the register device to perform the action based on receiving the indication of the user input

FIG. 5

GRAPHICAL USER INTERFACE FOR CENTRALIZED REGISTER DEVICE MANAGEMENT AND MONITORING

BACKGROUND

A display of a device may display a user interface (e.g., a graphical user interface (GUI)). A GUI is a form of user interface that allows users to interact with electronic devices. A user interface may permit interactions between a user of the device and the device. In some cases, the user may interact with the user interface to operate and/or control the device to produce a desired result. For example, the user may interact with the device to cause the device to perform an action. Additionally, the user interface may provide information to the user.

SUMMARY

Some implementations described herein relate to a non-transitory computer-readable medium that stores a set of instructions for providing a graphical user interface (GUI) for centralized register device management and monitoring for a device. The set of instructions, when executed by one or more processors of the device, may cause the device to receive information associated with a set of register devices, wherein the information indicates running state information for each register device included in the set of register devices, and wherein the information is extracted from log data produced by the set of register devices. The set of instructions, when executed by one or more processors of the device, may cause the device to generate, based on the information associated with the set of register devices, a document object model (DOM) for the GUI to cause the information to be displayed. The set of instructions, when executed by one or more processors of the device, may cause the device to provide the GUI for display by the device based on generating the DOM, wherein the GUI indicates the running state information, and wherein the GUI includes one or more user selection options for initiating actions to be performed by the set of register devices. The set of instructions, when executed by one or more processors of the device, may cause the device to receive, via the GUI, a user input associated with a user selection option, of the one or more user selection options, indicating an action to be performed by a register device of the set of register devices. The set of instructions, when executed by one or more processors of the device, may cause the device to communicate, with the register device or a server device, to cause the action to be performed by the register device based on receiving the user input indicating the action.

Some implementations described herein relate to a system for providing a GUI for centralized register device management and monitoring. The system may include one or more memories and one or more processors coupled to the one or more memories. The one or more processors may be configured to receive, via a data stream, log data associated with a set of register devices. The one or more processors may be configured to extract state information associated with the set of register devices from the log data based on one or more rules. The one or more processors may be configured to transmit, to a client device, presentation information to cause the state information associated with the set of register devices and one or more user selection options for initiating actions to be performed by the set of register devices to be displayed by the client device via the GUI. The one or more processors may be configured to receive, from the client device, an indication of a user input provided via the GUI associated with a user selection option of the one or more user selection options, wherein the user input indicates an action to be performed by a register device of the set of register devices. The one or more processors may be configured to communicate, with the register device, to cause the register device to perform the action based on receiving the indication of the user input.

Some implementations described herein relate to a method for providing a GUI for centralized register device management and monitoring. The method may include receiving, by a device and via a data stream, log data associated with a set of register devices. The method may include extracting, by the device, state information associated with the set of register devices from the log data based on one or more rules. The method may include transmitting, by the device and to a client device, presentation information to cause the state information associated with the set of register devices and one or more user selection options for initiating actions to be performed by the set of register devices to be displayed by the client device via the GUI. The method may include receiving, by the device and from the client device, an indication of a user input provided via the GUI associated with a user selection option of the one or more user selection options, wherein the user input indicates an action to be performed by a register device of the set of register devices. The method may include communicating, by the device and with the register device based on receiving the indication of the user input, to cause the register device to perform the action.

BRIEF DESCRIPTION OF THE DRAWINGS

FIG. 4 is a flowchart of an example process relating to a GUI for centralized register device management and monitoring.

FIG. 5 is a flowchart of an example process relating to a GUI for centralized register device management and monitoring.

DETAILED DESCRIPTION

Figure 1A:
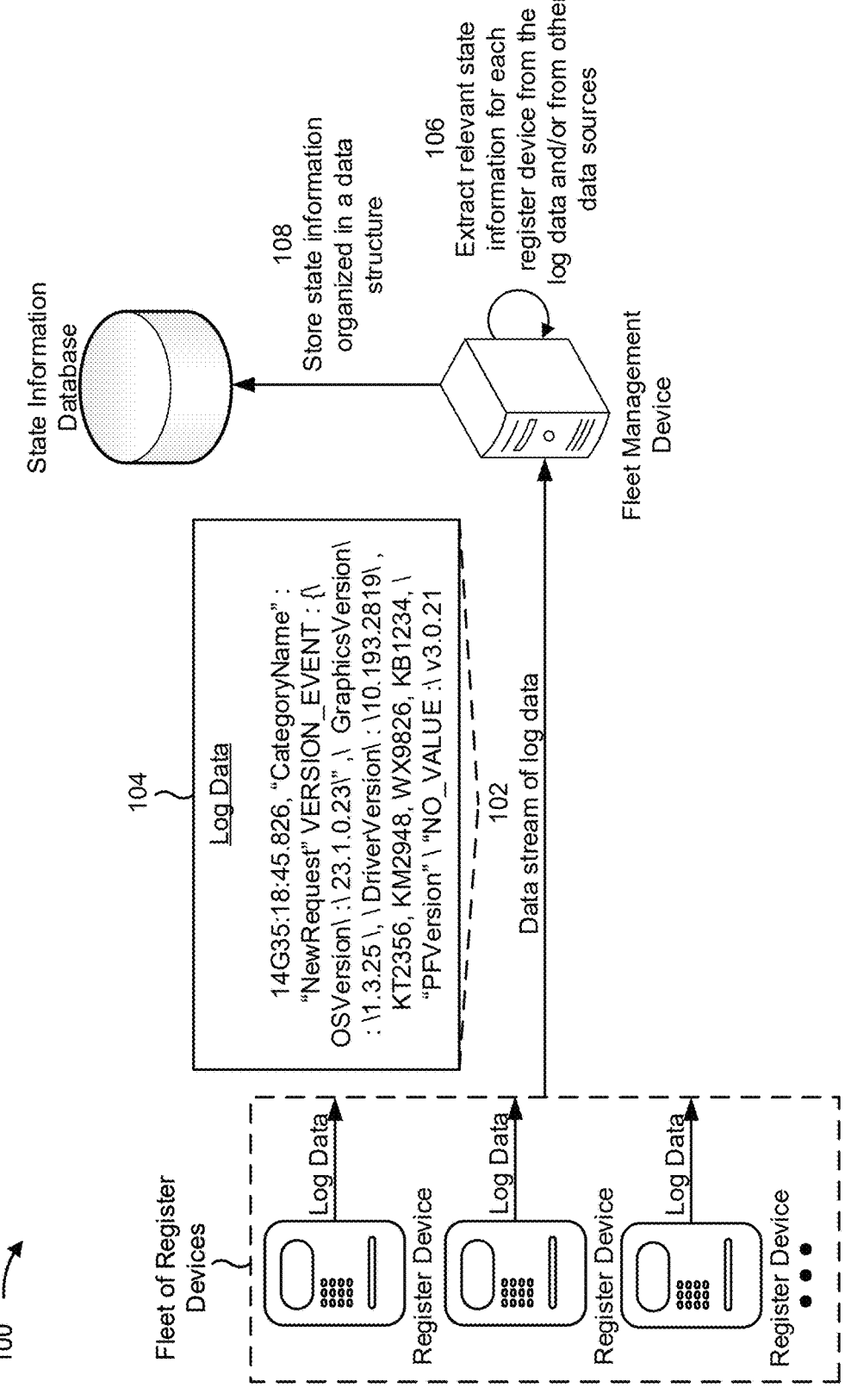
FIGS. 1A-1G are diagrams of an example implementation relating to a graphical user interface (GUI) for centralized register device management and monitoring.

The following detailed description of example implementations refers to the accompanying drawings. The same reference numbers in different drawings may identify the same or similar elements.

An automated teller machine (ATM) is an electronic communication device that enables users to perform financial transactions, such as cash withdrawals, deposits, funds transfers, or account information inquiries at any time without interacting directly with a human teller. An ATM may be referred to using other names, such as a register device, automated banking machine (ABM), a cashpoint, and/or a cash machine, among other examples. "Register device" and "ATM" may be used interchangeably herein.

In some cases, an institution may maintain or manage a fleet of ATMs. A "fleet" of ATMs may refer to a set of ATMs (e.g., one or more ATMs) that are all associated with, or managed by, the same institution. For example, a financial institution may manage a fleet of ATMs. The fleet of ATMs may be located at different physical locations. Therefore, managing or maintaining the fleet of ATMs may be difficult. For example, each ATM may generate or maintain log data that indicates a running state information of a particular ATM. "Running state information" of an ATM may include information associated with an operational status of the ATM. For example, running state information may include a status of one or more features of the ATM, one or more software programs installed on the ATM (e.g., and/or versions of the one or more software programs), a location of the ATM, and/or information associated with transactions performed by the ATM, among other examples. Running state information may also be referred to as "state information" herein. Maintaining and/or organizing running state information for a fleet of ATMs that may be difficult because ATMs included in the fleet of ATMs be located in different physical locations, may generate or store log data in different formats, and/or may be executing different software and/or different versions of software, among other examples.

For example, running state information may be collected separately for each ATM and stored collectively in a document or data store. For example, a user may retrieve log data for a given ATM, may interpret the log data, and may store running state information for the given ATM based on the log data. This may enable running state information for a fleet of ATMs to be stored in a single location. However, this consumes significant time resources, processing resources, and/or computing resources, among other examples, associated with retrieving and storing running state information individually for each ATM in the fleet of ATMs. Moreover, this may result in stored running state information for a given ATM being outdated because the running state information is collected statically (e.g., at a given point in time). As a result, if the running state information for the given ATM changes after the running state information has been collected and stored, the stored running state information may be outdated and/or incorrect. Performing actions and/or making determinations of actions to be performed based on outdated and/or incorrect running state information may result in performed actions being unnecessary (e.g., thereby consuming computing resources and/or time resources associated with performing the unnecessary actions) and/or may result in no action being performed when an action is necessary (e.g., thereby resulting in an ATM experiencing increased down time where the ATM is not functioning or is not functioning at a full capacity), among other examples.

Additionally, performing different actions for a given ATM based on the running state information introduces additional complexity and consumes significant computing, processing, and/or memory resources. For example, a user monitoring or maintain the fleet of ATMs may view and/or analyze running state information for an ATM via one or more platforms or data stores. The user may identify that one or more actions are to be performed with the ATM based on the running state information. For example, an action may include rebooting or resetting the ATM, updating software stored by the ATM, installing new software on the ATM, powering off or powering on the ATM, and/or taking a screen capture of a display of the ATM, among other examples. To perform a first action with the ATM, the user may navigate, via a client device, to a first platform or a first service. The user, via the client device, may interact with the first platform or the first service to cause the ATM to perform the first action. To perform a second action with the ATM, the user may navigate, via a client device, to a second platform or a second service. The user, via the client device, may interact with the second platform or the second service to cause the ATM to perform the second action. As a result, significant computing resources, processing resources, time resources, and/or memory resources may be consumed associated with the user navigating to and analyzing one or more platforms or data stores to view and analyze running state information and associated with the user navigating to and interacting with multiple different platforms or services to cause an ATM to perform different actions based on the running state information. Moreover, this introduces additional complexity because each of the different platforms or services may be associated with different programs, different security requirements, and/or different operating procedures, among other examples.

Some techniques and implementations described herein enable a graphical user interface (GUI) for centralized register device (e.g., ATM) management and monitoring. For example, the GUI may enable a user to view and/or interact with running state information for each ATM included in a fleet of ATMs. The GUI may be associated with, managed by, and/or provided by an institution that owns and/or manages the fleet of ATMs. The GUI may display real-time running state information for each ATM included in the fleet of ATMs by utilizing a data stream of log data produced by the ATMs. Additionally, the GUI may enable a user to perform one or more actions with a given ATM (e.g., may interact with the GUI to cause an ATM to perform the action). As a result, a user may view and interact with real-time running state information for the fleet of ATMs and may cause an ATM to perform an action from the same GUI. This may conserve computing resources, processing resources, time resources, and/or memory resources that would have otherwise been used associated with the user navigating to and analyzing one or more platforms or data stores to view and analyze running state information and associated with the user navigating to and interacting with multiple different platforms or services to cause an ATM to perform different actions based on the running state information.

For example, the real-time running state information may be displayed via the GUI using a data stream of log data produced by the ATMs. The log data may be provided by each ATM to the data stream via a network connection. For example, the log data may identify different files stored by the ATM and/or may identify different information associated with the ATM. A fleet management device may utilize one or more rules for identifying and/or extracting relevant data (e.g., relevant running state information) from the log data. For example, the log data may include irrelevant information and/or information that is difficult to comprehend or to store for the running state information. For example, a version of a software program installed on an ATM may be indicated by a file name in the log data, rather than in a field or data entry of the log data. Therefore, a version number may be extracted (e.g., from the file name) and stored by the fleet management device (e.g., rather than storing the actual file). The fleet management device may identify one or more files, from a set of files associated with the log data, based on one or more rules. The fleet management device may extract relevant information from the one or more files based on the one or more rules to obtain running state information associated with an ATM (e.g., the ATM that generated or produced the log data). The fleet management device may store the running state information in a data store using a format that enables the state information to be provided for display via the GUI. As a result, the fleet management device enables real-time running state information for the fleet of ATMs to be made available to the GUI and/or to be displayed by the GUI. This may ensure that actions and/or determinations of actions to be performed are not based on outdated or incorrect running state information.

In some implementations, the GUI may include a compliance page. The compliance page may display an indication of one or more ATMs that are not in compliance with a compliance rule. For example, a compliance rule may identify acceptable versions of software to be installed on ATMs included in the fleet of ATMs, among other examples as described in more detail elsewhere herein. The fleet management device may search or parse running state information associated with the fleet of ATMs (e.g., using the compliance rule(s)) to identify one or more ATMs that are not in compliance with the compliance rule(s). The fleet management device may cause information associated with the one or more ATMs to be displayed via the compliance page of the GUI. As a result, a single page of the GUI may display information for multiple ATMs that do not satisfy a compliance rule. The compliance page may include input options to enable an action to be initiated with the ATMs identified via the compliance page (e.g., to attempt to place with ATMs in compliance with the compliance rule(s)). As a result, computing resources, processing resources, time resources, and/or memory resources that would have otherwise been used to search for ATMs that are non-compliant, navigate to a platform or service associated with causing each identified ATM to perform one or more actions to place with ATM in compliance, and performing one or more actions to cause the identified ATMs to be placed in compliance. Moreover, the compliance page enables multiple actions to be initiated for a given ATM (e.g., and/or for multiple ATMs) from a single page, thereby conserving computing resources, processing resources, time resources, and/or memory resources that would have otherwise been used to initiate the multiple actions with the given ATM from multiple different pages, platforms, and/or services. For example, if the compliance page identifier 10 ATMs that are not in compliance with one or more compliance rules, a single action (e.g., a single user input) may be performed to cause each of the 10 ATMs to initiate an action to place with 10 ATMs in compliance with the one or more compliance rules (e.g., rather than requiring at least 10 different actions, associated with the 10 different ATMs, to be performed).

As a result, real-time running state information for a fleet of ATMs may be displayed via the GUI. This may enable a user to quickly identify and analyze running state information for the fleet of ATMs without navigating to multiple GUIs, multiple pages, and/or multiple platforms. Additionally, this ensures that the GUI is not displaying outdated or incorrect information. Additionally, a user may be enabled to initiate an action with a given ATM from the same GUI that displays the running state information of the given ATM. Therefore, the user is not required to navigate to different pages, different GUIs, and/or different platforms to view the running state information and initiate the action. In this way, computing resources and/or network resources may be conserved by reducing an amount of navigation performed by the user. Furthermore, the techniques and implementations described herein make ATM data easier to access by enhancing a user interface, thereby improving a user experience, enhancing user-friendliness of a client device and the user interface, and improving the ability of a user to identify and analyze running state information for a fleet of ATMs and to initiate action(s) with one or more ATMs based on the running state information. Moreover, this improves the ability of a user to manage or maintain the fleet of ATMs because only a single GUI is needed to manage or maintain the fleet of ATMs (e.g., the user does not need to navigate to and/or learn how to interact with multiple platforms, services, and/or GUIs to identify and/or analyze the running state information and to initiate actions with ATMs included in the fleet of ATMs).

FIGS. 1A-1G are diagrams of an example 100 relating to a GUI for centralized register device management and monitoring. As shown in FIGS. 1A-1G, example 100 includes a fleet of register devices (e.g., one or more register devices), a fleet management device, a state information database, a client device, and a rule database. These devices are described in more detail in connection with FIGS. 2 and 3. As described in more detail elsewhere herein, a register device may include an ATM, an ABM, a cashpoint, and/or a cash machine, among other examples.

As shown in FIG. 1A, each register device included in the fleet of register devices may generate log data. The log data may include information associated with programs or software executing on a given register device. Additionally, or alternatively, the log data generated by a register device may include information associated with actions or transactions performed by the register device. In some implementations, the log data may include one or more files generated and/or stored by a register device. In some implementations, the log data may include files associated with different features of a given register device and/or different software installed on the given register device.

As shown by reference number 102, each register device included in the fleet of register devices transmit or provide log data to a data stream. For example, a register device may provide log data generated by the register device to the data stream in real time. For example, log data from the fleet of register devices may be streamed to the fleet management device. For example, the fleet management device may receive the log data as, or shortly after, the log data is generated and/or stored by a register device included in the fleet of register devices.

As shown by reference number 104, the log data may be provided in a format associated with the log service or platform executing on a given ATM. As shown in FIG. 1A, the log data as transmitted by a register device may be difficult to comprehend or interpret. For example, the log data may use a format that causes the log data to be generated to identify information in a certain manner (e.g., by identifying files or file names in the log data with a certain naming convention or in a certain order). For example, the log data may not include indications as to what information included in the log data is for (e.g., the log data may not include an indication of a feature certain information is associated with, a vendor certain information is associated with, and/or what the information is conveying). In other words, the log data generated by the fleet of register devices may be in a raw or unprocessed form, making the log data difficult to comprehend and/or interpret. Therefore, the fleet management device may receive the log data, from the data stream, for the fleet of register devices. However, the fleet management device may be unable to simply store the log data in the format it is generated because meaningful running state information for a given register device may not be clearly indicated in the log data. Therefore, additional processing of the log data may be required, as described in more detail elsewhere herein, to enable the fleet management device to provide real-time running state information for the fleet of register devices to be displayed via the GUI.

Additionally, different register devices included in the fleet of register devices may generate log data in different formats. For example, a first register device may use a first format to generate log data and a second register device may use a second format to generate log data. Therefore, the fleet management device may be required to analyze the log data to extract relevant running state information from the log data.

As shown by reference number 106, the fleet management device may extract running state information associated with the fleet of register devices from the log data and/or from other data sources. For example, the fleet management device may use one or more rules to extract relevant information (e.g., relevant running state information) for a given register device from the log data generated by the given register device. The fleet management device may use one or more rules to identify log files that may indicate, or that may include, relevant running state information. For example, the log data transmitted to the fleet management device (e.g., via the data stream) may include all log files or log data generated by a given register device. However, not all log data or log files may include information that is relevant to the running state information (e.g., that is to be displayed via the GUI, as described in more detail elsewhere herein). Therefore, the fleet management device may use one or more rules to search for and/or identify one or more log files that are associated with running state information.

For example, a rule may be defined based on a file name, or information included in a file name, to identify a file that is associated with running state information (e.g., the register device may generate a log file with a certain name in each instance). Therefore, the fleet management device may be enabled to identify whether a log file is relevant or irrelevant. If the log file is relevant, then the fleet management device may extract running state information and/or may perform additional analysis associated with the log file to extract running state information. If the log file is irrelevant, then the fleet management device may disregard and/or may not perform any additional analysis on the log file. This may conserve resources that would have otherwise been used by the fleet management device analyzing the contents of each log file generated by a register device.

For example, a log file associated with a certain feature of a register device may include a phrase or one or more words in a name of the log file in each instance that a log file is generated for the certain feature. If the feature is relevant for the running state information of the register device, a rule may be defined (e.g., by a user) to enable the fleet management device to identify the log file. Additionally, one or more rules may be defined to enable the fleet management device to extract relevant information from an identified file. For example, a first rule may be defined to enable the fleet management device to identify a file and one or more additional rules may be defined to enable the fleet management device to extract relevant information from a particular file (e.g., the file identified by the first rule). For example, a user may define rules based on a format of a file type to enable the fleet management device to extract running state information from a file that is associated with the file type. The fleet management device may identify a file (e.g., based on a first rule) and may extract running state information from the file (e.g., based on one or more additional rules). For example, a first rule may enable the fleet management device to identify files associated with a first feature. A second rule may enable the fleet management device to identify an operational status of the first feature (e.g., based on an identified file associated with the first feature). A third rule may enable the fleet management device to identify a network connection status for the first feature, such as a network connection status with a vendor associated with the first feature. A fourth rule may enable the fleet management device to identify a version and/or a software program installed on the register device associated with the first feature. The above described rules are exemplary only and additional and/or different rules may be defined for a file type and/or other file types.

The rules for identifying and/or extracting running state information for a register device may be stored in the rule database or another database. The fleet management device may analyze log data that is received via the data stream, based on the one or more rules, to identify running state information for each register device included in the fleet of register devices. For example, the fleet management device may identify one or more files, from a set of files associated with the log data, based on the one or more rules. The fleet management device may extract relevant information from the one or more files based on the one or more rules to obtain the running state information associated with the fleet of register devices.

By using the one or more rules to identify running state information, the fleet management device may be enabled to extract the running state information from log data regardless of a format of the log data. For example, rules may be defined for various formats of the log data. The fleet management device may search, parse, and/or analyze log data (e.g., log data that uses different formats) based on the one or more rules. This enables the fleet management device to identify and extract relevant running state information for different register devices even where the different register devices use different formats to generate and/or store log data.

Additionally, or alternatively, the fleet management device may obtain running state information for a register device from a data source other than the log data. For example, some running state information for a register device may be stored in a different location and/or provided by a different device than the register device. For example, a location of a register device, a configuration status of a register device, previous actions performed with the register device (e.g., via the GUI as described in more detail elsewhere herein), and/or a date or time of a last update associated with a register device, among other examples, may not be included in, or indicated by, the log data generated by the register device. Therefore, the fleet management device may obtain some running state information for a register device from a data source or storage location that is different than the log data generated by the register device. In some implementations, the fleet management device may obtain the running state information for a register device from a data source or storage location that is different than the log data generated by the register device using one or more rules (e.g., in a similar manner as described above).

The running state information for a register device may include various information associated with the operational status, configuration, location, and/or other information associated with the register device. For example, the running state information may include an identifier of the register device, an operational status of the register device, a location of the register device, a status of one or more functions associated with the register device, a version of one or more software programs installed on the register device, and/or information associated with transactions performed by the register device, among other examples. For example, a register device may be capable of performing various features or transactions, such as a cash withdrawal, a cash deposit, a check deposit, and/or a bill payment, among other examples. The running state information may include an indication of an operational status of the various features or transactions for a register device (e.g., an indication of whether the register device is currently capable of performing the various features or transactions). For example, a log file may be generated for each feature or transaction type, and the fleet management device may extract an operational status of each feature or transaction type from the different log files generated by a register device. As another example, the running state information may include a connection status (e.g., a network connection status) with one or more vendors associated with a register device. For example, a register device may communicate with one or more vendors or entities via different network connections. The fleet management device may extract or identify a connection status of the register device with a given vendor or entity.

As another example, the running state information may include a status of a license for software or a program installed on the register device. For example, third-party software installed on a register device may be associated with a license. The running state information may include an indication of whether a license for software installed on the register device is valid or expired. As another example, the running state information may include an indication of different software programs (e.g., internal software programs installed on the register device and/or an indication of a version of each software program installed on the register device. In some implementations, the running state information may include an indication of information associated with hardware associated with the register device. For example, the running state information may include a version of an encrypting pin pad (EPP) installed on the register device. Additionally, or alternatively, the running state information may include an indication of errors or faults associated with hardware installed on the register device. In some implementations, the running state information may include one or more user experience logs indicating features, pages, and/or transaction types used by users of the register device (e.g., and/or indicating a number of uses or an amount of time spent using a feature, page, and/or transaction type). In some implementations, the running state information may include an indication of different transactions performed by the register device. The examples of running state information described herein are not intended to be exhaustive and other examples associated with an operational status, configuration, location, and/or other information associated with the register device may be included in the running state information.

As shown by reference number 108, the fleet management device may store the running state information (e.g., for one or more, or all, register devices included in the fleet of register devices) in the state information database. For example, the fleet management device may organize the extracted and/or identified information in a data store such that the running state information can be easily provided to a client device for presentation via the GUI. For example, the fleet management device may organize the running state information for a given register device (e.g., by feature, type of information, and/or category of information). The fleet management device may store the running state information in the state information database using a format or categorization to enable all relevant running state information for a given register device to be stored in a centralized location. For example, the fleet management device may use a restful application programming interface (API) to store the running state information for a register device in the state information database (e.g., organized in a manner that enables the running state information to be easily accessed and/or understood by a user and/or another device). As a result, the fleet management device is enabled to identify and extract relevant running state information from real-time log data generated by the fleet of register devices (and/or from other devices or data sources) and store real-time running state information for each register device included in the fleet of register devices in a centralized data storage location (e.g., the state information database). Additionally, the fleet management device is enabled to organize and store the running state information in a format or manner that enables the running state information to be quickly and easily accessed and/or displayed (e.g., via the GUI as described in more detail elsewhere herein).

Figure 1B:
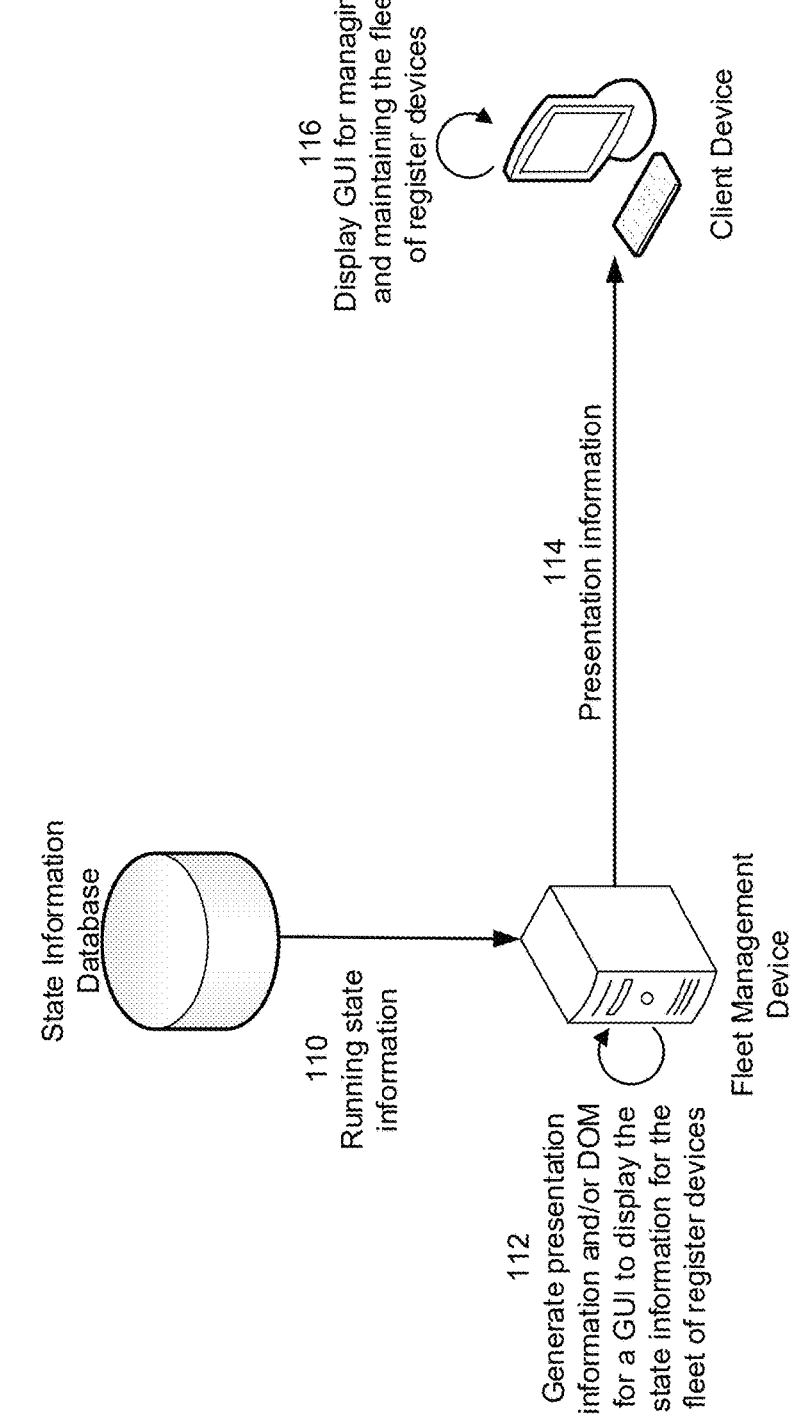

As shown in FIG. 1B, the fleet management device may use the running state information (e.g., for each register device included in the fleet of register devices) to generate presentation information for the GUI. The presentation information may identify content for the GUI that is to be provided for presentation by the client device. For example, the presentation information may identify content for a document object (e.g., one or more pages of the GUI requested by the client device) of the GUI. The document object may be associated with a document object model (DOM) that includes code for generating the document object (e.g., the page(s) of the GUI). For example, as shown by reference number 110, the fleet management device may obtain running state information for one or more (or all) register devices from the state information database. In some implementations, the fleet management device may obtain the running state information based on receiving a request from the client device. For example, an API (e.g., an orchestration API) may be associated with retrieving running state information from the state information database. For example, based on a request (e.g., a call) to the API and/or based on another rule being met or satisfied, the API may obtain running state information (e.g., that is based on the request or the satisfied rule). For example, the client device may transmit a request for running state information for a given register device. As another example, the client device may transmit a request for running state information for register devices that are associated with running state information that does not satisfy one or more compliance rules, as described in more detail elsewhere herein. The fleet management device (e.g., and/or the orchestration API) may search and/or obtain running state information, from the state information database, based on the request from the client device.

As shown by reference number 112, the fleet management device may generate the presentation information for the GUI based on the running state information obtained from the information state database. For example, the presentation information may include information that causes the running state information associated with the fleet of register devices to be displayed by the client device via the GUI. In some implementations, the presentation information may include information that causes one or more user selection options for initiating actions to be performed by a register device to be displayed by the client device via the GUI. A user selection option may be an input option or a selectable option that, when selected by a user via the GUI, causes the client device and/or the fleet management device to perform an action (e.g., associated with causing a register device to perform an action, as described in more detail elsewhere herein). For example, the presentation information may, when transmitted to the client device, cause one or more of the pages described herein to be displayed via the client device.

As shown by reference number 114, the fleet management device may transmit, and the client device may receive, the presentation information. In some implementations, the fleet management device may transmit the presentation information via the API (e.g., the orchestration API). In some implementations, the fleet management device may transmit, and the client device may receive, information to cause separate pages (e.g., a register page as depicted and described in more detail in connection with FIG. 1C) for each register device of the set of register devices and a compliance page (e.g., as depicted and described in more detail in connection with FIGS. 1D and 1E) to be made available for display via the GUI. For example, a separate page, of the separate pages for each register device, associated with a register device may indicate running state information associated with the register device. The compliance page may indicate one or more register devices, from the fleet of register devices, that are associated with running state information that does not satisfy one or more compliance rules.

As shown by reference number 116, the client device may display the GUI (e.g., may display one or more pages of the GUI, as described in more detail elsewhere herein). For example, the client device may generate and/or execute, based on the presentation information associated with the set of register devices, a DOM for the GUI to cause the running state information and/or the presentation information to be displayed. The client device may provide the GUI for display by the device based on generating the DOM. For example, the client device may cause the GUI to be displayed on a display or a screen of the client device.

Figure 1C:
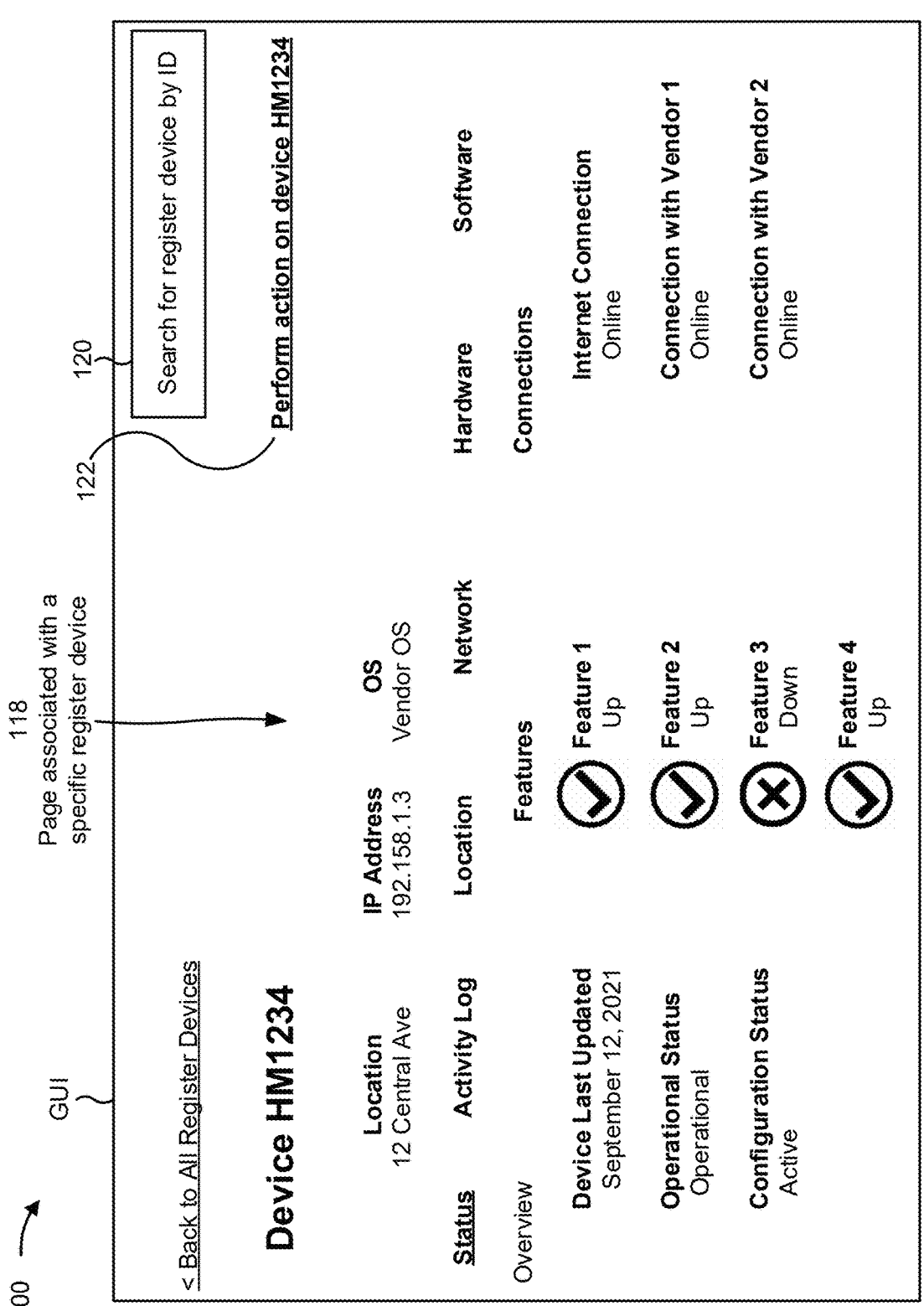

For example, as shown in FIG. 1C, and by reference number 118, a page associated with a specific register device may be displayed by the client device via the GUI. For example, the GUI may include a page (e.g., a register device page) that displays running state information for a given register device from the fleet of register devices. The register device page may indicate an identifier associated with the register device (e.g., "Device HM1234" as shown in FIG. 1C). Additionally, as shown by reference number 120, the register device page may include a search field. The search field may enable a user to search for another register device included in the fleet of register devices. For example, the user may enter an identifier of the register device into the search field. The client device and/or the fleet management device may retrieve running state information associated with the register device indicated by the search. The client device may display, via the GUI, a register device page associated with the register device indicated by the search (e.g., in a similar manner as described herein). In this way, the GUI may enable a user to search and/or view register device pages for multiple (or for each) register devices included in the fleet of register devices.

As shown by reference number 122, the register device page may include a user selection option for performing actions associated with the register device (e.g., the register device that is associated with the register device page). If the client device receives a user input selecting the user selection option, then the client device and/or the fleet management device may cause an action page to be displayed. The action page is depicted and described in more detail in connection with FIG. 1F.

As shown in FIG. 1C, the register device page may display running state information for the register device associated with the register device page (e.g., for the device HM1234). For example, the register device page may indicate a location of the register device (e.g., "12 Central Ave" as depicted in FIG. 1C). As another example, the register device page may indicate an internet protocol (IP) address of the register device (e.g., "192.158.1.3" as depicted in FIG. 1C). As another example, the register device page may indicate an operating system (OS) that is currently configured and/or executing on the register device (e.g., "Vendor OS" as depicted in FIG. 1C).

In some implementations, the register device page may include one or more tabs, shown as a "Status" tab, an "Activity Log" tab, a "Location" tab, a "Network" tab, a "Hardware" tab, and a "Software" tab. Each tab, when selected by a user via the GUI, may cause information with different types of running state information to be displayed. For example, the status tab, when selected, may cause running state information associated with an overall status of the register device to be displayed. For example, as shown in FIG. 1C, the register device page may indicate overview information associated with the register device, such as a date on which the register device was last updated (e.g., Sep. 12, 2021, as shown in FIG. 1C), an operational status (e.g., operational or non-operational, indicating whether the register device as a whole is functioning or operational, and/or a configuration status (e.g., active or non-active, indicating whether the register device is configured), among other examples.

Additionally, as shown in FIG. 1C, the register device page may indicate running state information associated with different features supported by the register device. For example, the register device page may indicate running state information associated with a feature 1, a feature 2, a feature 3, and a feature 4. The running state information associated with the features may indicate whether the feature is currently operational for the register device (e.g., indicating whether the register device is currently able to perform the feature). For example, for the feature 1, the feature 2, and the feature 4, the running state information may indicate that the features are operational (e.g., "up" as depicted in FIG. 1C). In other words, the running state information for the register device may indicate that the register device is currently able to perform operations associated with the feature 1, the feature 2, and the feature 4. For the feature 3, the running state information may indicate that the feature is not operational (e.g., "down" as depicted in FIG. 1C). In other words, the running state information for the register device may indicate that the register device is not currently able to perform operations associated with the feature 3. This may enable a user to quickly and easily identify an operational status of different features of the register device.

As another example, the register device page indicates running state information associated with one or more connections associated with the register device. For example, the register device page may indicate a status of an internet connection of the register device (e.g., online as depicted in FIG. 1C). Additionally, the register device page may indicate a status of a connection (e.g., a network connection) with one or more vendors or third-party entities. For example, the register device may communicate with the one or more vendors or third-party entities to perform operations or actions associated with one or more features of the register device. Therefore, the GUI and/or the register device page may enable a user to quickly and easily identify a status of a connection with the one or more vendors or third-party entities (e.g., enabling the user to perform an action to establish a connection between the register device and a vendor or third-party entity if the connection has been lost).

The activity log tab, when selected, may cause information associated with previously performed actions and/or transactions associated with the register device to be displayed. For example, the activity log tab, when selected, may cause information associated with actions that were previously initiated via the GUI with the register device (e.g., actions initiated via the action page depicted in FIG. 1F) to be displayed via the register device page. For example, an indication of the action, a date or time of the action, and/or a user identifier associated with a user that initiated the action, among other examples, may be displayed via the register device page when the activity log tab is selected. As another example, the activity log tab, when selected, may cause information associated with transactions completed by the register device to be displayed via the register device page.

The location tab, when selected, may cause information associated with the physical location of the register device to be displayed. For example, a city, state, territory, zip code, and/or other location information associated with the register device may be displayed via the register device page when the location tab is selected by a user via the GUI. In some implementations, information associated with an entity (e.g., a bank, an institution, or another entity) that is associated with a location where the register device is physically located may be displayed via the register device page when the location tab is selected by a user via the GUI.

The network tab, when selected, may cause information associated with one or more network connections to be displayed. For example, detailed network connection information, network connection identifiers, and/or other network connection information may be displayed via the register device page when the network tab is selected by a user via the GUI. The hardware tab, when selected, may cause information associated with one or more hardware components to be displayed. For example, an identifier or a model of a hardware component, a configuration of a hardware component, and/or an operational status of a hardware component, among other examples, may be displayed via the register device page when the hardware tab is selected by a user via the GUI.

The software tab, when selected, may cause information associated with one or more software programs installed on the register device to be displayed. For example, an identifier of a software program installed on the register device, a version of a software program installed on the register device, a last update date of a software program installed on the register device, and/or an operational status of a software program installed on the register device, among other examples, may be displayed via the register device page when the software tab is selected by a user via the GUI. For example, the client device (e.g., via the GUI and/or the register device page) may display an indication of an identifier of the register device, an operational status of the register device, a location of the register device, a status of one or more functions associated with the register device, a version of one or more software programs installed on the register device, information associated with transactions performed by the register device, and/or an archive of past actions performed by the register device based on user inputs to the GUI, among other examples.

In this way, a user may quickly and easily identify and analyze information associated a status of the register device, an activity log of the register device, a location of the register device, one or more network connections associated with the register device, one or more hardware components of the register device, and/or one or more software programs installed on the register device, among other examples. Additionally, the user may be enabled to initiate an action (e.g., to be performed by the register device) from the register device page (e.g., by selecting the user selection option indicated by reference number 122) based on analyzing the information displayed via the register device page and/or the GUI. Therefore, a user is not required to navigate to different pages, different GUIs, and/or different platforms to view the running state information and initiate the action. In this way, computing resources and/or network resources may be conserved by reducing an amount of navigation performed by the user. Furthermore, register device running state information is easier to access by enhancing the GUI as described herein, thereby improving a user experience, enhancing user-friendliness of a client device and the GUI, and improving the ability of a user to identify and analyze running state information for a fleet of register device and to initiate action(s) with one or more register devices based on the running state information.

Figure 1D:
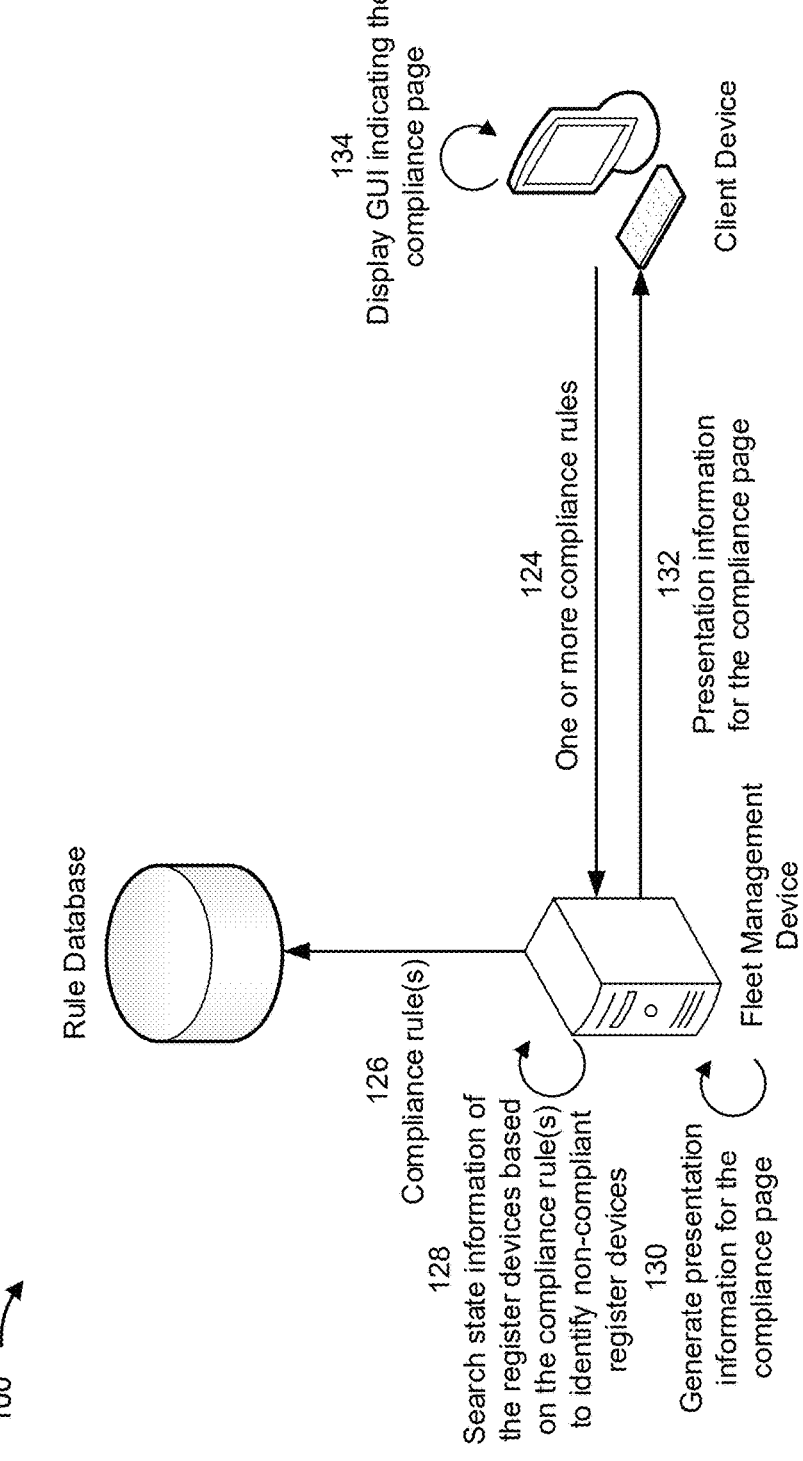

As shown in FIG. 1D, the fleet management device may perform one or more actions associated with causing information associated with non-compliant register devices to be displayed via the GUI and/or a compliance page of the GUI. For example, as shown by reference number 124, the client device (or another device) may transmit, and the fleet management device may receive, an indication of one or more compliance rules. For example, the one or more compliance rules may be input via the GUI and/or another user interface displayed by the client device. A compliance rule may indicate a standard or acceptable running state information for a register device included in the fleet of register devices. For example, a compliance rule may indicate an acceptable or an allowable version (or versions) of a software program (e.g., and any register devices that have a different version of the software installed may be non-compliant). For example, a compliance rule may indicate allowable versions of register device software. As another example, a compliance rule may indicate an allowable last date of an update (e.g., and any register devices that were last updated prior to the allowable last date may be non-compliant).

As shown by reference number 126, the fleet management device may store the one or more compliance rules in the rule database. This may enable the fleet management device (and/or an API associated with the fleet management device) to periodically search or parse the running state information associated with the fleet of register devices to identify non-compliant register devices. A "non-compliant register device" may be a register device that is associated with running state information that does not satisfy at least one compliance rule. For example, the fleet management device may obtain one or more compliance rules from the rule database.

For example, as shown by reference number 128, the fleet management device (and/or an API, such as the orchestration API) and/or the client device may search the running state information of the register devices based on the one or more compliance rules to identify non-compliant register devices. For example, the fleet management device and/or the client device may search, based on the one or more compliance rules, the running state information for each register device included in the set of register devices. The fleet management device and/or the client device may identify one or more register devices (e.g., one or more non-compliant register devices), from the set of register devices, associated with the running state information that does not satisfy the one or more rules based on searching the running state information for each register device (e.g., included the fleet of register devices). As shown by reference number 130, the fleet management device and/or the client device may generate presentation information for a compliance page. The compliance page may be a page associated with the GUI that indicates information for non-compliant register devices. The presentation information may identify content for the GUI that is to be provided for presentation by the client device via the compliance page. For example, the presentation information may identify content for a document object (e.g., the compliance page of the GUI requested by the client device) of the GUI. The document object may be associated with a DOM that includes code for generating the document object (e.g., the page(s) of the GUI). For example, the fleet management device and/or the client device may generate a DOM for the compliance page to indicate the one or more non-compliant register devices and to indicate the running state information (e.g., of the one or more non-compliant register devices) that does not satisfy the one or more compliance rules.

In some implementations, as shown by reference number 132, the fleet management device may transmit, and the client device may receive, the presentation information for the compliance page. For example, the fleet management device may transmit an indication of code or a DOM for the compliance page to the client device. As shown by reference number 134, the client device may cause the presentation information associated with the compliance page to be displayed via the client device. For example, the client device may display the GUI indicating or displaying the compliance page.

Figure 1E:
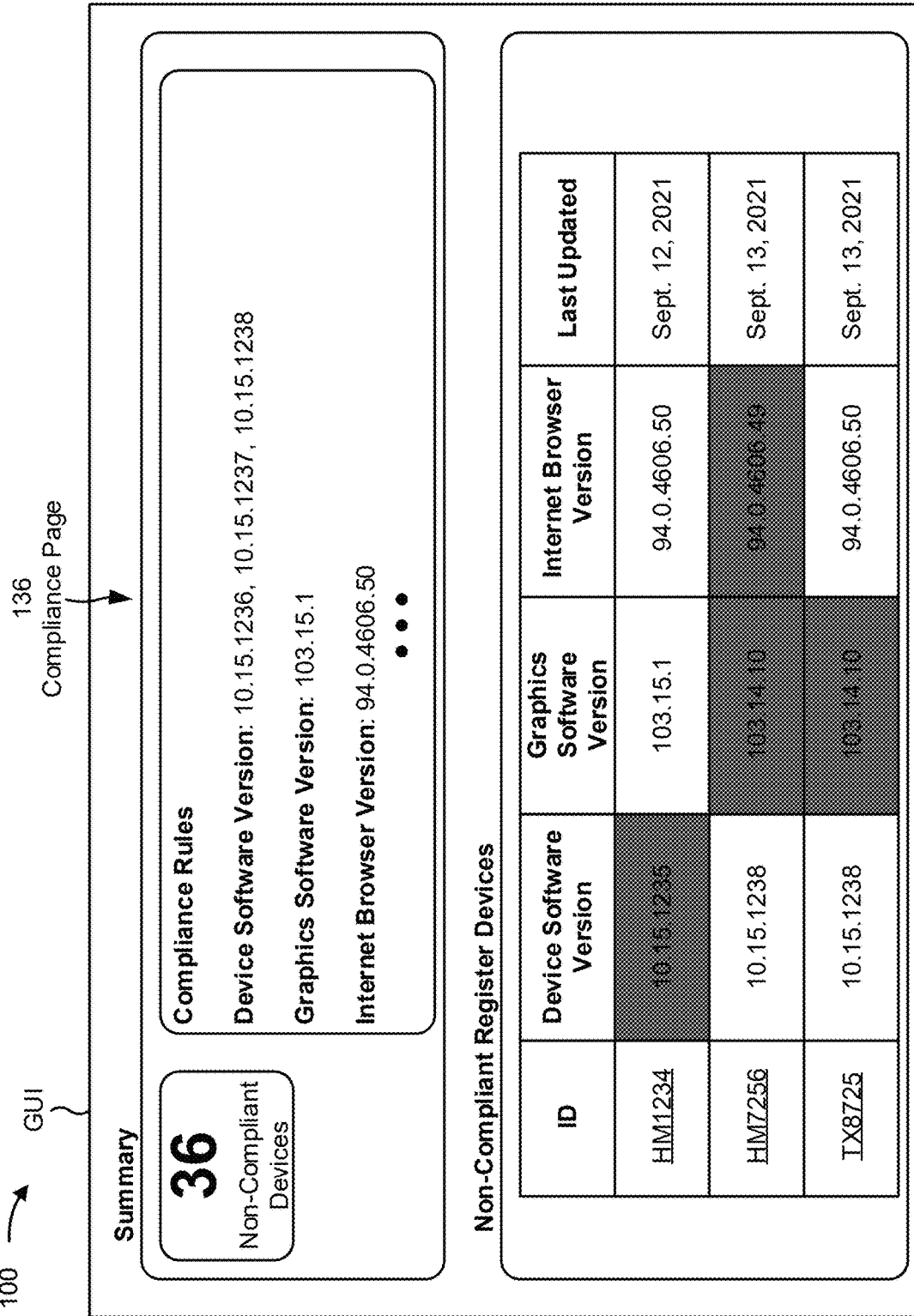

FIG. 1E depicts an example compliance page associated with the GUI. For example, as shown by reference number 136, the compliance page may indicate the one or more compliance rules and/or running state information for one or more non-compliant register devices. For example, as shown in FIG. 1E, a summary section of the compliance page may indicate a number of non-compliant register devices included in the fleet of register devices (e.g., 36 as depicted in FIG. 1E). Additionally, or alternatively, the summary section of the compliance page may indicate the one or more compliance rules that were used to identify the non-compliant register devices, as described in more detail elsewhere herein. For example, as shown in FIG. 1E, a first compliance rule may indicate allowable device software versions (e.g., 10.15.1236, 10.15.1237, and 10.15.1238 as depicted in FIG. 1E). For example, any register device, included in the fleet of register devices, that does not have device software with a version indicated by the first compliance rule installed on the first register device may be identified as a non-compliant register device (e.g., by the fleet management device and/or the client device). A second compliance rule may indicate an allowable graphics software version (e.g., 103.15.1 as depicted in FIG. 1E). A third compliance rule may indicate an allowable internet browser version (e.g., 94.0.4606.50 as depicted in FIG. 1E). Other compliance rules may be defined and/or indicated by the compliance page.

As shown in FIG. 1E, the compliance page may include running state information for the one or more non-compliant register devices. For example, the compliance page of the GUI may indicate running state information that does not satisfy the one or more compliance rules. In some implementations, the compliance page may indicate an identifier of the non-compliant register devices. For example, as shown in FIG. 1E, a register device with the identifier HM1234 may be identified. The running state information associated with the register device may include a device software version of 10.15.1235, a graphics software version of 103.15.1, and an internet browser version of 94.0.4606.50. As shown in FIG. 1E, the compliance page may include an indication that the device software version of the register device does not satisfy a compliance rule (e.g., because the version 10.15.1235 is not indicated as an allowable device software version by a compliance rule). As another example, a register device with the identifier HM7256 may be identified. The running state information associated with the register device may include a device software version of 10.15.1238, a graphics software version of 103.14.10, and an internet browser version of 94.0.4606.49. As shown in FIG. 1E, the compliance page may include an indication that the graphics software version and the internet browser version of the register device does not satisfy a compliance rule (e.g., because the graphics software version 103.14.10 and the internet browser version 94.0.4606.49 are not indicated as allowable versions by the compliance rule(s)).

In this way, the compliance page may display a single entry for each register device even if the register device has multiple types of running state information that does not satisfy compliance rules. For example, the compliance page may include a single entry for the register device with the identifier HM7256, even though the register device with the identifier HM7256 is associated with a graphics software version and an internet browser version that does not satisfy compliance rules. This may improve user access and/or enable a user to quickly identify issues with a given register device. For example, this may improve an ability of a user to identify and/or initiate actions associated with a non-compliant register device. For example, if the compliance page were to include a first list of register devices that do not have compliant device software versions, a second list of register devices that do not have compliant graphics software versions, a third list of register devices that do not have compliant inter browser versions, and so on, a given register device may be included in multiple lists. Therefore, a user may consume additional resources (e.g., computing resources, processing resources, and/or network resources) navigating the multiple lists to identify and/or interact with the same register device multiple times. Because of the format of the compliance page as depicted in FIG. 1E, a user may be enabled to identify all issues with a register device via a single entry or a single field, thereby reducing a complexity associated with identifying non-compliant running state information and/or conserving resources that would have otherwise been used to navigate to multiple lists, multiples pages, and/or multiple GUIs to identify all the non-compliant running state information for a given register device.

In some implementations, the compliance page may include a user selection option associated with each non-compliant register device. For example, as shown in FIG. 1E, a user may interact with (e.g., click or provide a user input to) the identifier of a register device. This may cause the client device and/or the fleet management device to cause the GUI to display a register device page (e.g., similar to the register device page depicted in FIG. 1C) associated with the register device (e.g., if the identifier "HM1234" is selected, the GUI may display a register device page associated with the register device HM1234). This may enable a user to quickly and easily investigate issues with running state information for a given non-compliant register device.

Additionally, this may enable the user to quickly and easily navigate to an action page (e.g., as depicted and described in more detail in connection with FIG. 1F) associated with a given non-compliant register device (e.g., to enable to user to initiate an action with the register device to cause the register device to be placed in compliance with the one or more compliance rules).

In some implementations, the compliance page may include one or more user selection options to enable a user to initiate an action associated with a non-compliant register device. For example, the compliance page may include a user selection option to enable a user to initiate an action that causes a software of a non-compliant register device to be update or modified (e.g., such that the version of the software is compliant with the one or more compliance rules). In some implementations, the compliance page may include a user selection option to enable a user to initiate multiple actions with multiple register devices via a single user selection option. For example, a user selection option may enable a user to initiate actions to resolve or fix all running state information that is non-compliant. If the single user selection option is selected via a user input to the GUI, the client device and/or the fleet management device may communicate with one or more (or all) non-compliant register devices to modify, update, or change running state information of the non-compliant register devices that does not satisfy the one or more compliance rules. This may conserve processing resources, computing resources, and/or network resources that would have otherwise been used to address issues with each non-compliant register device individually.

In some implementations, the client device and/or the fleet management device may automatically perform one or more actions based on identifying a non-compliant register device. For example, the client device and/or the fleet management device may automatically (e.g., without receiving a user input to the GUI) communicate, with the one or more non-complaint register devices or a server device, to cause the one or more non-compliant register devices to perform an action to cause the running state information that does not satisfy one or more rules to be modified to satisfy the one or more rules. This may conserve processing resources, computing resources, and/or network resources that would have been used by a user to investigate and/or initiate the action(s). Moreover, this may reduce an amount of time that running state information for a register device is in a non-compliant state.

Figure 1F:
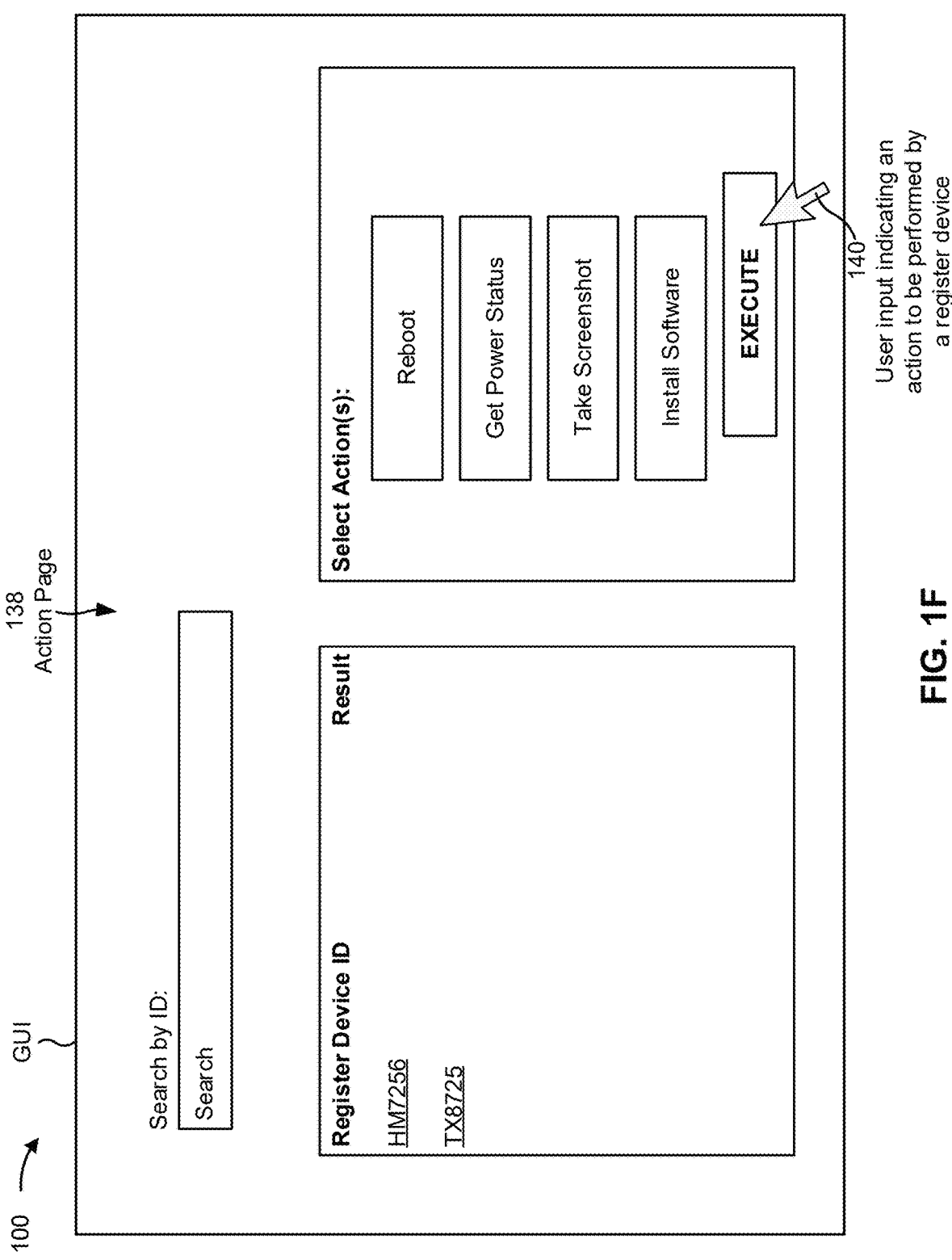

FIG. 1F depicts an example action page that is associated with causing one or more register devices to perform an action. For example, the action page may be displayed via the GUI based on a user input to the user selection option indicated by reference number 122 in FIG. 1C. As shown by reference number 138, an action page may include an indication of one or more register devices to be associated with a selected action. In some implementations, the action page may be associated with a specific register device. In some other implementations, the action page may be associated with multiple register devices (e.g., a selected action may be initiated with the multiple register devices from the same action page). For example, as shown in FIG. 1F, a register device HM7256 and a register device TX8725 may be associated with (or selected to be associated with) the action page.

As shown in FIG. 1F, the action page may include one or more user selection options for initiating different actions with a register device. For example, the different actions may include rebooting the register device (e.g., "Reboot"), obtaining a power status of the register device (e.g., "Get Power Status"), powering the register device on or off, installing software on the register device (e.g., "Install Software"), installing an updated version of software installed on the register device, and/or causing an image of a display of the register device to be captured (e.g., "Take Screenshot"), among other examples. A user may select, via the GUI, one or more action options from the one or more user selection options to cause the one or more actions (e.g., indicated by the one or more action options) to be performed by the register device(s) indicated by the register device page. For example, if a user selects the reboot option, the fleet management device and/or the client device may communicate with the register device(s) indicated by the register device page to cause the register device(s) to be rebooted.

As shown by reference number 140, the client device may receive, via the GUI, a user input indicating an action to be performed by a register device. For example, a user may select one or more action options from the one or more user selection options by interacting with the GUI. In this way, the GUI may enable a user to identify and/or investigate running state information for the fleet of register devices (e.g., via one or more register device pages and/or a compliance page) and may enable the user to initiate an action with a given register device (e.g., via the action page) based on the running state information from the same GUI. This may reduce a complexity associated with initiating the action and may conserve resources (e.g., processing resources, computing resources, and/or network resources) that would have otherwise been used to identify, analyze, and/or investigate running state information for the fleet of register devices and/or initiate action(s) for a given register device using multiple platforms, multiple services, and/or multiple GUIs, among other examples.

Figure 1G:
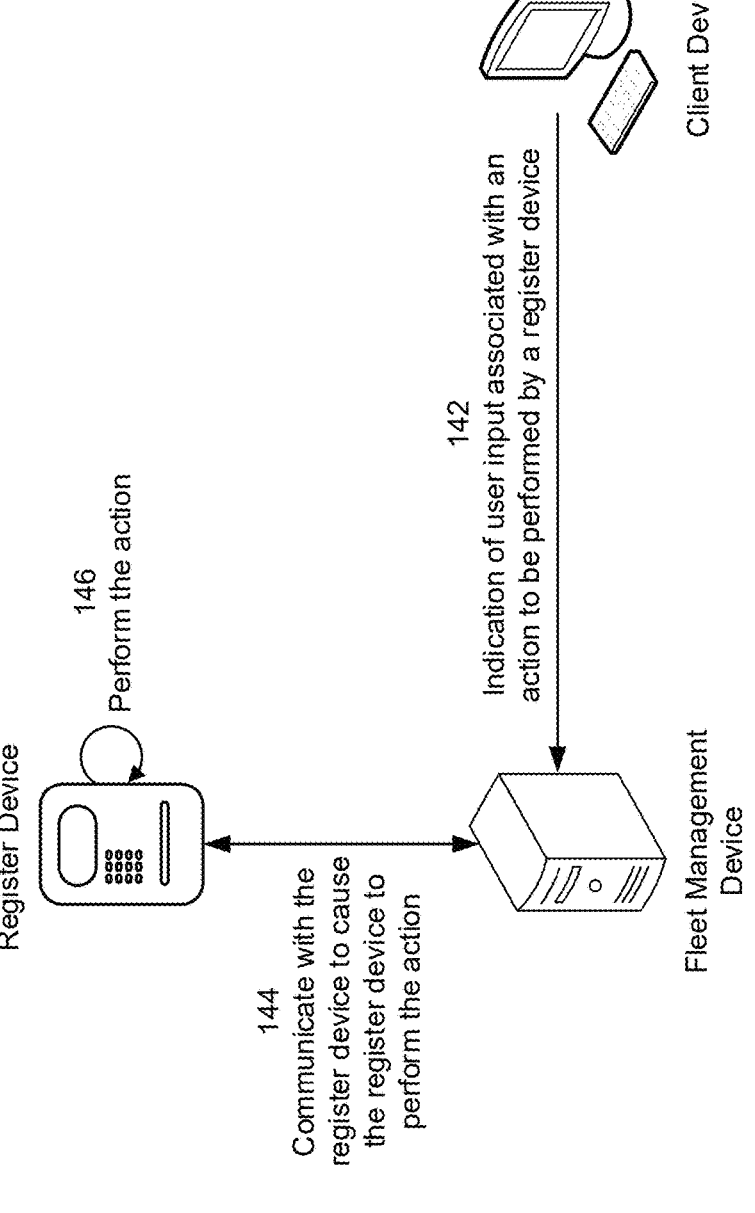

As shown in FIG. 1G, an example of an action being performed by a register device based on a user input to the GUI is depicted. For example, as shown by reference number 142, the client device may transmit, and the fleet management device may receive, an indication of an action to be performed by the register device. For example, the client device may transmit an indication of a user input associated with an action to be performed by the register device. Alternatively, the client device may not transmit and the indication to the fleet management device and may instead communicate directly with the register device to cause the register device to perform an action (e.g., in a similar manner as described in connection with reference number 144).

As shown by reference number 144, the fleet management device (or the client device) may communicate, with the register device, to cause the action to be performed by the register device based on the user input to the GUI indicating the action. For example, the fleet management device may communicate, with the register device, to cause the register device to perform the action based on receiving the indication of the user input. In some implementations, the action may include rebooting the register device, powering the register device on or off, installing software on the register device, causing the register device to transmit information to the fleet management device and/or another device (e.g., such as the client device or a device associated with a vendor or a third-party entity), installing an updated version of software installed on the register device, and/or causing an image (e.g., a screenshot) of a display of the register device to be captured, among other examples. As shown by reference number 146, the register device may perform the action based on communicating with the fleet management device and/or the client device.

In this way, the GUI described herein enables real-time running state information for a fleet of register devices to be displayed via the GUI, thereby enabling a user to quickly identify and analyze running state information for the fleet of register devices without navigating to multiple GUIs, multiple pages, and/or multiple platforms. Additionally, a user may be enabled to initiate an action with a given register device from the same GUI that displays the running state information of the given register device. Therefore, the user is not required to navigate to different pages, different GUIs, and/or different platforms to view the running state information and initiate the action. In this way, computing resources and/or network resources may be conserved by reducing an amount of navigation performed by the user. Furthermore, the techniques and implementations described herein make register device data easier to access by enhancing a user interface, thereby improving a user experience, enhancing user-friendliness of a client device and the user interface, and improving the ability of a user to identify and analyze running state information for a fleet of register devices and to initiate action(s) with one or more register devices based on the running state information.

As indicated above, FIGS. 1A-1G are provided as an example. Other examples may differ from what is described with regard to FIGS. 1A-1G.

Figure 2:
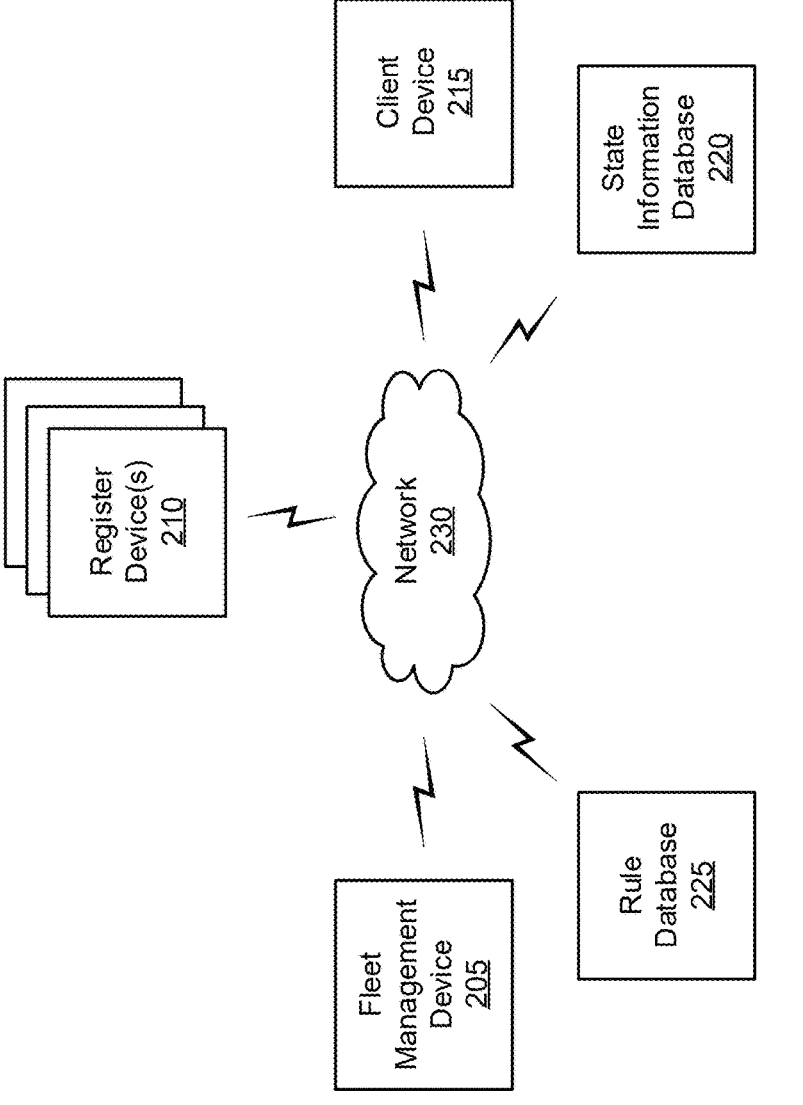
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a fleet management device 205, one or more register devices 210, a client device 215, a state information database 220, a rule database 225, and a network 230. Devices of environment 200 may interconnect via wired connections, wireless connections, or a combination of wired and wireless connections.

The fleet management device 205 includes one or more devices capable of receiving, generating, storing, processing, providing, and/or routing information associated with providing a GUI for centralized register device management and monitoring, as described elsewhere herein. The fleet management device 205 may include a communication device and/or a computing device. For example, the fleet management device 205 may include a server, such as an application server, a client server, a web server, a database server, a host server, a proxy server, a virtual server (e.g., executing on computing hardware), or a server in a cloud computing system. In some implementations, the fleet management device 205 includes computing hardware used in a cloud computing environment.

A register device 210 includes one or more devices capable of performing various types of financial transactions, such as a cash withdrawal, a money deposit (e.g., a check or cash deposit), a money transfer (e.g., a transfer from one bank account to another bank account), and/or access to information related to an account (e.g., a bank account, a checking account, a credit account, etc.), among other examples. For example, a register device 210 includes one or more devices capable of receiving, generating, storing, processing, and/or providing information associated with providing a GUI for centralized register device management and monitoring, as described elsewhere herein. A register device 210 may include an ATM, an ABM, a cash point, a Cashline®, a Minibank®, a cash machine, a Tyme® machine, a cash dispenser, a Bankomat®, a Bancomat®, and/or a similar type of device. In some implementations, a register device 210 may include one or more input components and/or output components to facilitate receiving and/or transmitting data to and/or from the register device 210. Example input components of a register device 210 may include a number keypad, a touchscreen, a magnetic stripe reader, a chip reader, a camera, a scanner (e.g., a barcode scanner, and/or quick response (QR) code scanner), and/or a radio frequency (RF) signal reader, among other examples. Example output components of a register device 210 may include a display device, a speaker, and/or a printer, among other examples. A register device 210 may also include a currency output component configured to dispense currency based on a result of authorizing the request.

The client device 215 includes one or more devices capable of receiving, generating, storing, processing, and/or providing information associated with providing a GUI for centralized register device management and monitoring, as described elsewhere herein. The client device 215 may include a communication device and/or a computing device. For example, the client device 215 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), and/or a similar type of device.

The state information database 220 includes one or more devices capable of receiving, generating, storing, processing, and/or providing information associated with providing a GUI for centralized register device management and monitoring, as described elsewhere herein. The state information database 220 may include a communication device and/or a computing device. For example, the state information database 220 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the state information database 220 may store running state information for the one or more register devices 210, as described elsewhere herein.

The rule database 225 includes one or more devices capable of receiving, generating, storing, processing, and/or providing information associated with providing a GUI for centralized register device management and monitoring, as described elsewhere herein. The rule database 225 may include a communication device and/or a computing device. For example, the rule database 225 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the rule database 225 may store one or more rules associated with identifying, analyzing and/or providing information for the GUI, as described elsewhere herein.

The network 230 includes one or more wired and/or wireless networks. For example, the network 230 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 230 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
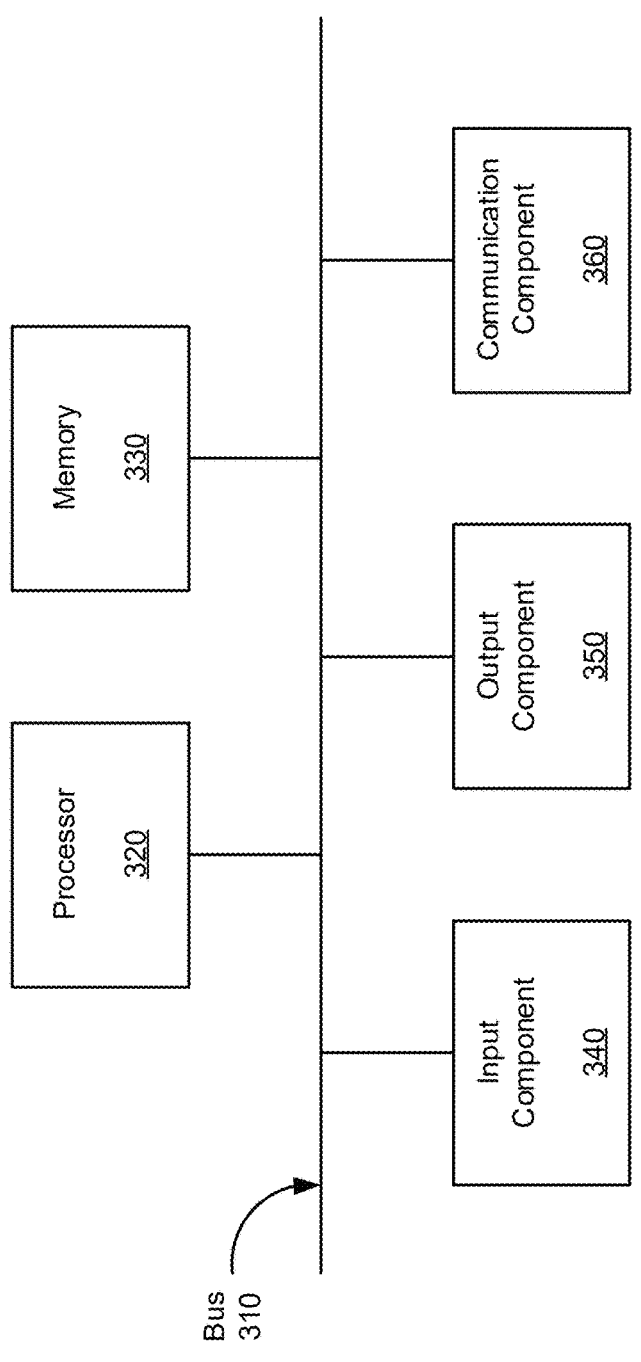
FIG. 3 is a diagram of example components of one or more devices of FIG. 2.

FIG. 3 is a diagram of example components of a device 300, which may correspond to the fleet management device 205, a register devices 210, the client device 215, the state information database 220, and/or the rule database 225. In some implementations, the fleet management device 205, a register devices 210, the client device 215, the state information database 220, and/or the rule database 225 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with providing a GUI for centralized register device management and monitoring. In some implementations, one or more process blocks of FIG. 4 may be performed by a device (e.g., client device 215 or fleet management device 205). In some implementations, one or more process blocks of FIG. 4 may be performed by another device or a group of devices separate from or including the device, such as register device 210, state information database 220, and/or rule database 225. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving information associated with a set of register devices (block 410). In some implementations, the information indicates running state information for each register device included in the set of register devices. In some implementations, the information is extracted from log data produced by the set of register devices. As further shown in FIG. 4, process 400 may include generating, based on the information associated with the set of register devices, a DOM for the GUI to cause the information to be displayed (block 420). As further shown in FIG. 4, process 400 may include providing the GUI for display by the device based on generating the DOM (block 430). In some implementations, the GUI indicates the running state information. In some implementations, the GUI includes one or more user selection options for initiating actions to be performed by the set of register devices. As further shown in FIG. 4, process 400 may include receiving, via the GUI, a user input associated with a user selection option, of the one or more user selection options, indicating an action to be performed by a register device of the set of register devices (block 440). As further shown in FIG. 4, process 400 may include communicating, with the register device or a server device, to cause the action to be performed by the register device based on receiving the user input indicating the action (block 450).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flowchart of an example process 500 associated with providing a GUI for centralized register device management and monitoring. In some implementations, one or more process blocks of FIG. 5 may be performed by a device (e.g., fleet management device 205). In some implementations, one or more process blocks of FIG. 5 may be performed by another device or a group of devices separate from or including the device, such as register device 210, client device 215, state information database 220, and/or rule database 225. Additionally, or alternatively, one or more process blocks of FIG. 5 may be performed by one or more components of device 300, such as processor 320, memory 330, input component 340, output component 350, and/or communication component 360.

As shown in FIG. 5, process 500 may include receiving, via a data stream, log data associated with a set of register devices (block 510). As further shown in FIG. 5, process 500 may include extracting state information associated with the set of register devices from the log data based on one or more rules (block 520). As further shown in FIG. 5, process 500 may include transmitting, to a client device, presentation information to cause the state information associated with the set of register devices and one or more user selection options for initiating actions to be performed by the set of register devices to be displayed by the client device via the GUI (block 530). As further shown in FIG. 5, process 500 may include receiving, from the client device, an indication of a user input provided via the GUI associated with a user selection option of the one or more user selection options (block 540). In some implementations, the user input indicates an action to be performed by a register device of the set of register devices. As further shown in FIG. 5, process 500 may include communicating, with the register device based on receiving the indication of the user input, to cause the register device to perform the action (block 550).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A non-transitory computer-readable medium storing a set of instructions for providing a graphical user interface (GUI) for centralized register device management and monitoring, the set of instructions comprising:

one or more instructions that, when executed by one or more processors of a device, cause the device to:

receive log data associated with a set of register devices, wherein the log data is in different formats for different register devices of the set of register devices, and wherein the log data is produced by the set of register devices:

determine whether the log data is relevant, wherein the log data is disregarded based on determining that the log data is not relevant:

extract, based on determining that the log data is relevant, information from the log data based on different rules that correspond to the different formats, wherein the information indicates running state information for each register device included in the set of register devices, and wherein each of the different rules are defined for different formats related to the log data:

generate, based on the information associated with the set of register devices, a document object model (DOM) for the GUI to cause the information to be displayed;

provide the GUI for display by the device based on generating the DOM, wherein the GUI indicates the running state information, and wherein the GUI includes one or more user selection options for initiating actions to be performed by the set of register devices;

receive, via the GUI, a user input associated with a user selection option, of the one or more user selection options, indicating an action to be performed by a register device of the set of register devices; and communicate, with the register device or a server device, to cause the action to be performed by the register device based on receiving the user input indicating the action.

2. The non-transitory computer-readable medium of claim 1, wherein the one or more instructions, that cause the device to provide the GUI for display, cause the device to:

display the GUI indicating running state information for the register device, wherein the running state information includes at least one of:

an identifier of the register device, an operational status of the register device, a location of the register device, a status of one or more functions associated with the register device, a version of one or more software programs installed on the register device, information associated with transactions performed by the register device, or an archive of past actions performed by the register device based on user inputs to the GUI.

3. The non-transitory computer-readable medium of claim 1, wherein the one or more instructions, when executed by the one or more processors, further cause the device to:

provide, for display via the GUI, a compliance page, wherein the compliance page indicates one or more register devices, from the set of register devices, associated with running state information that does not satisfy one or more compliance rules.

4. The non-transitory computer-readable medium of claim 3, wherein the one or more instructions, when executed by the one or more processors, further cause the device to:

receive an indication of the one or more compliance rules, wherein the one or more compliance rules indicate allowable versions of register device software.

5. The non-transitory computer-readable medium of claim 3, wherein the one or more instructions, when executed by the one or more processors, further cause the device to:

search, based on the one or more compliance rules, the running state information for each register device included in the set of register devices;

identify the one or more register devices, from the set of register devices, associated with the running state information that does not satisfy the one or more compliance rules based on searching the running state information for each register device; and generate a DOM for the compliance page to indicate the one or more register devices and to indicate the running state information that does not satisfy the one or more compliance rules.

6. The non-transitory computer-readable medium of claim 3, wherein the one or more instructions, when executed by the one or more processors, further cause the device to:

automatically communicate, with the one or more register devices or the server device, to cause the one or more register devices to perform an action to cause the running state information that does not satisfy one or more compliance rules to be modified to satisfy the one or more compliance rules.

7. The non-transitory computer-readable medium of claim 3, wherein the one or more instructions that cause the device to communicate, with the register device or the server device, to cause the action to be performed by the register device, cause the device to:

communicate, with the register device or the server device, to cause the register device to perform the action, wherein the action includes at least one of:

rebooting the register device, powering the register device on or off, installing software on the register device, installing an updated version of software installed on the register device, or causing an image of a display of the register device to be captured.

8. The non-transitory computer-readable medium of claim 1, wherein the set of register devices includes a set of automated teller machines (ATMs).

9. A system for providing a graphical user interface (GUI) for centralized register device management and monitoring, the system comprising:

one or more memories; and one or more processors, communicatively coupled to the one or more memories, configured to:

receive, via a data stream, log data associated with a set of register devices, wherein the log data is in different formats for different register devices of the set of register devices, and wherein the log data is produced by the set of register devices:

determine whether the log data is relevant, wherein the log data is disregarded based on determining that the log data is not relevant:

extract, based on determining that the log data is relevant, state information associated with the set of register devices from the log data based on different rules that correspond to the different formats, wherein each of the different rules are defined for different formats related to the log data:

transmit, to a client device, presentation information to cause the state information associated with the set of register devices and one or more user selection options for initiating actions to be performed by the set of register devices to be displayed by the client device via the GUI;

receive, from the client device, an indication of a user input provided via the GUI associated with a user selection option of the one or more user selection options, wherein the user input indicates an action to be performed by a register device of the set of register devices; and communicate, with the register device, to cause the register device to perform the action based on receiving the indication of the user input.

10. The system of claim 9, wherein the one or more processors, to extract the state information associated with the set of register devices from the log data, are configured to:

identify one or more files, from a set of files associated with the log data, based on the rules;

extract relevant information from the one or more files based on the rules to obtain the state information associated with the set of register devices; and store the state information in a data store using a format that enables the state information to be provided for display via the GUI.

11. The system of claim 9, wherein the one or more processors, to extract the state information associated with the set of register devices from the log data, are configured to:

extract, for a single register device of the set of register devices, at least one of:

an identifier of the register device, an operational status of the register device, a location of the register device, a status of one or more functions associated with the register device, a version of one or more software programs installed on the register device, or information associated with transactions performed by the register device.

12. The system of claim 9, wherein the one or more processors, to transmit the presentation information, are configured to:

transmit information to cause separate pages for each register device of the set of register devices and a compliance page to be made available for display via the GUI, wherein a separate page, of the separate pages for each register device, associated with the register device indicates state information associated with the register device, and wherein the compliance page indicates one or more register devices, from the set of register devices, associated with state information that does not satisfy one or more compliance rules.

13. The system of claim 9, wherein the one or more processors are further configured to:

obtain one or more compliance rules indicating allowable versions of register device software;

search the state information for each register device included in the set of register devices based on the one or more compliance rules; and identify one or more register devices, from the set of register devices, associated with the state information that does not satisfy the one or more compliance rules based on searching the state information for each register device.

14. The system of claim 13, wherein the one or more processors are further configured to:

transmit, to the client device, information to cause a compliance page to be displayed via the GUI, wherein the compliance page indicates the one or more register devices and indicates the state information that does not satisfy the one or more compliance rules.

15. The system of claim 9, wherein the GUI provided for display further indicates non-compliant state information with a different color element or a shaded element.

16. A method for providing a graphical user interface (GUI) for centralized register device management and monitoring, comprising:

receiving, by a device and via a data stream, log data associated with a set of register devices, wherein the log data is in different formats for different register devices of the set of register devices, and wherein the log data is produced by the set of register devices;

determining whether the log data is relevant, wherein the log data is disregarded based on determining that the log data is not relevant;

extracting, by the device and based on determining that the log data is relevant, state information associated with the set of register devices from the log data based on different rules that correspond to the different formats, wherein each of the different rules are defined for different formats related to the log data;

transmitting, by the device and to a client device, presentation information to cause the state information associated with the set of register devices and one or more user selection options for initiating actions to be performed by the set of register devices to be displayed by the client device via the GUI;

receiving, by the device and from the client device, an indication of a user input provided via the GUI associated with a user selection option of the one or more user selection options, wherein the user input indicates an action to be performed by a register device of the set of register devices; and communicating, by the device and with the register device based on receiving the indication of the user input, to cause the register device to perform the action.

17. The method of claim 16, wherein extracting the state information associated with the set of register devices from the log data comprises:

identifying one or more files, from a set of files associated with the log data, based on the rules;

extracting relevant information from the one or more files based on the rules to obtain the state information associated with the set of register devices; and storing the state information in a data store using a format that enables the state information to be provided for display via the GUI.

18. The method of claim 16, wherein extracting the state information associated with the set of register devices from the log data comprises:

extracting, for a single register device of the set of register devices, at least one of:

an identifier of the register device, an operational status of the register device, a location of the register device, a status of one or more functions associated with the register device, a version of one or more software programs installed on the register device, or information associated with transactions performed by the register device.

19. The method of claim 16, wherein transmitting the presentation information comprises:

transmitting information to cause separate pages for each register device of the set of register devices and a compliance page to be made available for display via the GUI, wherein a separate page, of the separate pages for each register device, associated with the register device indicates state information associated with the register device, and wherein the compliance page indicates one or more register devices, from the set of register devices, associated with state information that does not satisfy one or more compliance rules.

20. The method of claim 16, further comprising:

obtaining one or more compliance rules indicating allowable versions of register device software;

searching the state information for each register device included in the set of register devices based on the one or more compliance rules; and identifying one or more register devices, from the set of register devices, associated with the state information that does not satisfy the one or more compliance rules based on searching the state information for each register device.

* * * * *